United States Patent [19]
Gilev et al.

[11] 3,708,054
[45] Jan. 2, 1973

[54] DEVICE FOR STACKING STATOR LAMINATIONS

[76] Inventors: Vitaly Konstantinovich Gilev, 118, 811 proezd, 65, kv. 16; Jury Vagarshevich Ovanesov, ulitsa Mayakovskogo, 17, kv. 8; Rafael Tevosovich Sarkisov, ulitsa Aga-Neimatully, 20a, kv. 28; Ernst Arakelovich Stepanyan, ulitsa Druzhby Molodezhi, 2, kv. 36, all of Baku, U.S.S.R.

[22] Filed: July 14, 1971

[21] Appl. No.: 162,348

[52] U.S. Cl............198/33 AC, 29/203 L, 198/213, 214/6 DK, 271/1, 271/68, 271/80, 271/86
[51] Int. Cl...........................................B65g 47/24
[58] Field of Search............271/68, 63, 1, 80, 86; 29/203 L, 211 L; 214/6 DK, 6 F, 6 H, 1 Q; 198/33 R, 213, 33 AC

[56] References Cited
UNITED STATES PATENTS

| | | |
|---|---|---|
| 1,993,937 | 3/1935 | Macy............................198/33 AC X |
| 2,964,840 | 12/1960 | Saylor et al.....................214/6 DK |
| 3,006,062 | 10/1961 | Loy.................................29/203 L |
| 3,507,382 | 4/1970 | Wells.................................198/213 |

*Primary Examiner*—Evon C. Blunk
*Assistant Examiner*—Bruce H. Stoner, Jr.
*Attorney*—Eric H. Waters et al.

[57] ABSTRACT

The device comprises auger screws for rotating the stator laminations whose outer edges are provided with inward stacking marks and slots for fastening the stacks, and a mechanism for orienting the stator laminations, made of two vertical rotatable shafts whose upper portions are of the tapering shape. The auger screws are positioned parallel to the shafts and installed together with the latter along an imaginary circumference, forming a cylindrical space for the movement in it of the stator laminations.

4 Claims, 4 Drawing Figures

DEVICE FOR STACKING STATOR LAMINATIONS

The present invention relates to devices for stacking (oriented laying) of stator laminations whose outer edges are provided with inward stacking marks and slots for fastening of the stacks, and can be utilized in the manufacture of electrical machines.

Known in the art at present are the devices for stacking stator laminations whose outer edges have inward stacking marks and slots for fastening the stacks, comprising auger screws for rotating the stator laminations and a mechanism for orienting the laminations by the inward stacking mark.

In this device the auger screws are positioned parallel to each other so that their rotation axes are horizontal and form an arching surface of a horizontal tray with a radius corresponding to the radius of the stator laminations. The laminations fed into this tray retain their vertical position and start rotating around their center and moving horizontally due to rotation of the auger screws.

The mechanism for orienting stator laminations in these devices has the form of a spring-loaded pawl stop which, snapping into the stacking mark and the adjacent slot should stop further rotation of the stator lamination as it moves onto the receiving tray. Inasmuch as the auger screws from an arching horizontal tray, it is not improbable that the stacked laminations may get displaced upward which will disturb their oriented position.

Besides, the lamination being stacked contacts the auger screws only under its own weight so that it may slip and stop rotating during rotation of the auger screws. The amount of slipping depends on the condition of the external stamped surface of the lamination which makes it impossible to calculate accurately the length of the auger screws on which the length of the stacking path depends. Therefore the auger screws are made purposely long which increases the stacking time thereby reducing the efficiency of the device.

A disadvantage of the orienting mechanism resides also in that, the pawl stop is forced off by each stacked lamination until said pawl stop snaps into the stacking mark and slot in the course of rotation and movement of the stator lamination. Hence, it is actually impossible to stack the next lamination before the preceding one has been stacked in position, because a new lamination fed onto the auger screws forces off the pawl stop and the lamination oriented earlier loses its orientation.

Besides, the stacked laminations in the known device are carried out by the auger screws onto the receiving tray which is provided sometimes with a key. However, the stacked laminations can be moved farther either manually or each following lamination leaving the auger screw must push the preceding one. This tells adversely on the operation and efficiency of the device as a whole.

In view of the fact that the stator laminations move in a vertical position, assembly of the stacked laminations directly on the mandrels for further treatment of the lamination stacks (i.e., compacting and fastening), becomes difficult.

An object of the present invention resides in providing a device for stacking stator laminations wherein the auger screws and the mechanism for orienting stator laminations would be made and installed so as to ensure simultaneous, continuous and automatic stacking of several stator laminations with concurrent assembly of the stacked laminations on mandrels.

This object is achieved by providing a device for stacking stator laminations whose outer edges are provided with inward stacking marks and slots for fastening the stacks, comprising auger screws for rotation of the stator laminations and a mechanism for orienting the stator laminations by the inward stacking mark in which, according to the invention, the auger screws are set so that their axes of rotation are vertical and the orienting mechanism consists of two rotatable shafts installed vertically at such a distance from each other which is equal to the distance between the stacking mark and the adjacent slot, the upper part of each shaft tapering upward; the rotatable shafts and auger screws are installed parallel to one another along an imaginary circumference, thus forming a cylindrical space for the movement of stator laminations.

In such a design of the claimed device the rotating auger screws embrace the received stator laminations from all sides and move them down where the thicker lower part of the rotatable shafts deforms the circular stator laminations, pressing them against the auger screw grooves. As a result, the stator laminations are made to rotate until the moment when the stacking mark and the adjacent slot check with the rotatable shafts after which the oriented lamination straightens out, continues to be moved down by the auger screws, without rotation, and is placed on the mandrel. Relative displacement of the oriented laminations after stacking is actually impossible since the forces of friction between the auger screws and the straightened lamination are insufficient for deforming the lamination again and shifting it from the oriented position.

Besides, the device ensures simultaneous stacking of several laminations whose number depends only on the height of the claimed device.

To guarantee free passage of the oriented laminations onto the mandrel it is practicable that the difference of the radiuses of the upper and lower parts of the rotatable shafts should be equal to the depth of the inward stacking mark and slot in the lamination.

To prevent undue engagement of the stacking mark and slot with the auger screws it is practicable that the device should be provided with additional shafts positioned along an imaginary circumference near the auger screws at a distance which is not divisible by the distance between the slots for fastening the stator lamination stacks and not equal to the distance between the rotatable shafts.

Thus, this design of the device for stacking stator laminations ensures continuous orienting of all the laminations fed for stacking, and a high efficiency of the device because the latter guarantees concurrent stacking of several laminations.

Now the invention will be described in detail by way of example, with reference to the accompanying drawings, in which.

Figure 1:
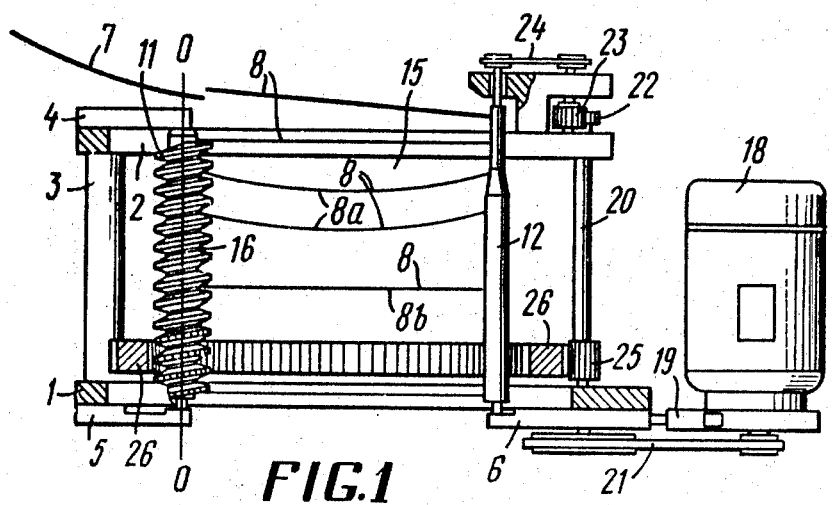
FIG. 1 is a general front view of the device according to the invention, partly cut away.

The device for stacking stator laminations of electrical machines comprises a body which consists of lower frame 1 (FIGS. 1 and 2) and an upper frame 2, rigidly interconnected by columns 3. Secured to the upper frame 2 are supporting strips 4 whereas supporting strips 5 and a supporting plate 6 are fastened to the lower frame 1.

The device for stacking stator laminations is installed under the chute 7 of the press (not shown) from which the stator laminations 8 fall into the device, said laminations being provided on the outer edge with inward stacking marks 9 (FIG. 4) and slots 10 for fastening the laminations 8 into stacks. The shape of the stacking marks 9 and slots 10 may vary, but their depth must be the same.

The device comprises auger screws 11 (FIG. 1) intended to rotate the stator laminations 8, and a mechanism for orienting them. The auger screws 11 are installed in the supporting strips 4 and 5 so that their axes O—O are vertical.

Figure 3:
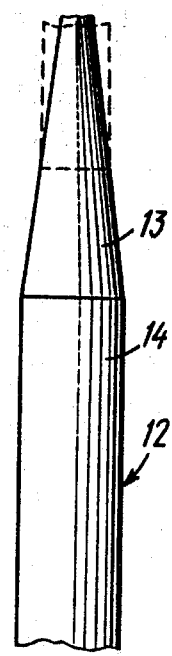
FIG. 3 illustrates the shape of the orienting shaft in the device.

The mechanism for orienting the stator laminations 8 consists of two rotatable shafts 12 vertically mounted on the supporting plate 6. The shafts 12 are positioned at such a distance from each other which is equal to the distance between the stacking mark 9 (FIG. 4), and the adjacent slot 10. Besides, the upper part 13 of each rotatable shaft 12 tapers upward in the form of a truncated cone or a truncated cone merging into a cylinder of a smaller diameter (shown by dotted lines in FIG. 3), the difference between the radiuses of the upper part 13 and lower part 14 of the shafts 12 being equal to the depth of the inward stacking mark 9 and slot 10.

Figure 2:
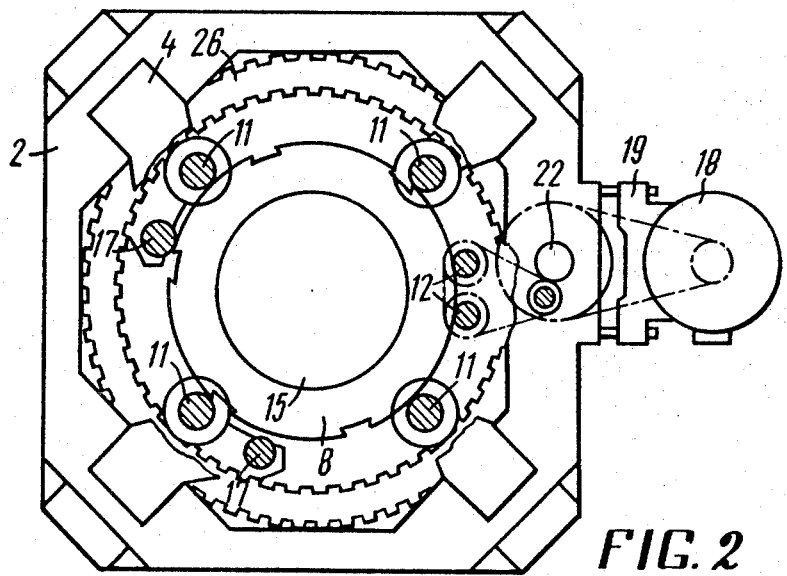
FIG. 2 is a general plan view of the device according to the invention.

The rotatable shafts 12 (FIG. 2) and auger screws 11 are installed parallel to one another along an imaginary circumference whose diameter is equal to that of the stator lamination, forming a cylindrical space 15 receiving the stator laminations from the chute 7 (FIG. 1).

To prevent the slots 10 and stacking mark 9 from engaging the helical grooves 16 of the auger screw 11, the device comprises additional shafts 17 (FIG. 2) positioned along an imaginary circumference near the auger screws 11 at a distance which is not divisible by the distance between the slots 10 and not equal to the distance between the rotatable shafts 12. The grooves 16 of the auger screw 11, the surfaces of the additional shafts 17 and the upper parts 13 of the shafts 12 are in contact with said imaginary circumference.

The auger screws 11 and shafts 12 are rotated by an electric motor 18 mounted on the bracket 19 of the plate 6 (FIG. 1), via a shaft 20 coupled with the shaft of the electric motor 18 by a belt transmission 21. Mounted on the upper portion of the shaft 20 is a gear 22 meshing with the gear-shaft 23 which is connected by a belt transmission 24 with the shafts 12.

The lower part of the shaft 20 carries a gear 25 which meshes with a toothed ring 26. The latter has teeth both on the outer and inner perimeters, the outer teeth meshing with the gear 25 whereas the inner teeth engage the lower turns of the auger screws 11 which are also provided with teeth.

The claimed device functions as follows.

Rotation is transmitted from the electric motor 18 to the shaft 20 by the belt transmission 21. The gears 25 and 22 mounted on the shaft 20 transmit rotation, respectively, to the toothed ring 26 and shaft-gear 23. The ring 26 rotates the driving auger screws 11 while the shaft-gear 23 rotates the shafts 12 via the belt transmission 24.

The stator laminations fall from the chute 7 into the cylindrical space 15 and rest on the turns of the auger screws 11 which, rotating, feed the laminations 8 down; owing to the tapering part 13 of the shafts 12 the stator laminations 8 fit freely into the helical grooves 16 of the auger screws 11 and are carried down by them.

Figure 4:
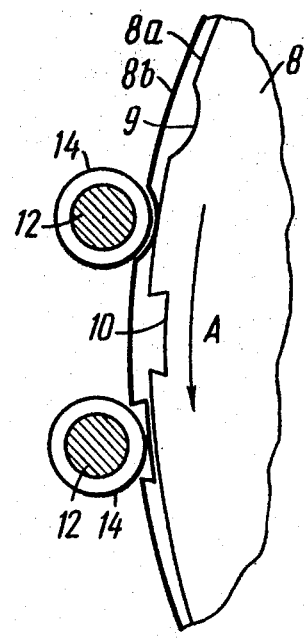
FIG. 4 shows the positions of the deformed stator lamination in the oriented state.

On its way down the lamination 8 comes over the widening portions 13 of the shafts 12 and, owing to an increasing diameter of this portion, the stator lamination is subjected to elastic deformation as shown in FIGS. 1 and 4 (position of the deformed lamination 8 in these figures is denoted by number 8a) and is pressed against the grooves 16 of the auger screws 11.

Further downward movement of the lamination is accompanied by its rotation around its center in the direction shown by arrow A (FIG. 4) till the moment when the stacking mark 9 and the adjacent slot 10 snap on the parts 14 of the shafts 12.

The lamination 8 oriented in this way straightens out, takes the position denoted by No. 8b (FIGS. 1 and 4) and, already without rotation, continues to move down onto the mandrel (not shown in the drawing).

In the course of stacking the additional shafts 17 rotate freely in the centers and keep the slots 10 or the stacking mark 9 of the lamination 8 from engaging the auger screws 11.

What we claim is:

1. A device for stacking stator laminations whose outer edges are provided with inward stacking marks and slots for fastening the stacks, comprising: a frame; plates secured on the upper and lower parts of said frame; auger screws installed in said plates having vertically directed axes of rotation, and intended to revolve the stator laminations and move them down during rotation; a mechanism for orienting the stator laminations by the inward stacking mark, made of two rotatable shafts, said shafts being installed vertically in said plates at such a distance from each other which is equal to the distance between said stacking mark and the adjacent slot; the upper part of each of said shafts tapers upward and is intended to accommodate freely the stator laminations in a horizontal plane while these laminations are being moved by said auger screws; said auger screws and rotatable shafts are positioned parallel to one another along an imaginary circumference whose diameter is equal to that of the stator lamination, thus constituting a cylindrical space for the movement of the stator laminations; a drive for rotating said auger screws and shafts means for transmitting rotation from said drive to said auger screws and shafts.

2. A device according to claim 1 wherein the difference between the radiuses of the upper and lower parts of the rotatable shafts is equal to the depth of the inward stacking mark and slot of the stator lamination.

3. A device according to claim 1 wherein there are additional shafts positioned along said imaginary circumference near the auger screws at a distance which is not divisible by the distance between the slots for fastening the stator lamination stacks and not equal to the distance between the rotatable shafts.

4. A device according to claim 2 wherein there are additional shafts positioned along an imaginary circumference near the auger screws at a distance which is not divisible by the distance between the slots for fastening the stator lamination stacks and not equal to the distance between the rotatable shafts.

* * * * *